(12) United States Patent
Oku (10) Patent No.: US 9,135,541 B2
(45) Date of Patent: Sep. 15, 2015

(54) IMAGE FORMING APPARATUS AND NONVOLATILE MEMORY WRITING METHOD

(75) Inventor: Toyoaki Oku, Osaka (JP)

(73) Assignee: KYOCERA Document Solutions Inc. (JP)

( * ) Notice: Subject to any disclaimer, the term of this patent is extended or adjusted under 35 U.S.C. 154(b) by 952 days.

(21) Appl. No.: 12/979,017

(22) Filed: Dec. 27, 2010

(65) Prior Publication Data

US 2011/0157653 A1 Jun. 30, 2011

(30) Foreign Application Priority Data

Dec. 28, 2009 (JP) ................................. 2009-297073

(51) Int. Cl.
*G06K 15/00* (2006.01)
*G06F 11/14* (2006.01)

(52) U.S. Cl.
CPC .......... *G06K 15/408* (2013.01); *G06F 11/1441* (2013.01)

(58) Field of Classification Search
CPC ............................ G06F 12/0831; G06F 12/08
USPC ....... 711/141, 146, 143, 145, E12.04, E12.07
See application file for complete search history.

(56) References Cited

U.S. PATENT DOCUMENTS

| 5,930,553 A * | 7/1999 | Hirst et al. ..................... 399/8 |
| 6,516,440 B1 * | 2/2003 | Teradaira ...................... 714/763 |
| 6,725,351 B1 | 4/2004 | Shimizu |
| 2005/0257001 A1 * | 11/2005 | Tanaka ......................... 711/112 |
| 2009/0237711 A1 * | 9/2009 | Oku ............................. 358/1.15 |
| 2009/0310412 A1 * | 12/2009 | Jang et al. ................ 365/185.11 |
| 2010/0238507 A1 * | 9/2010 | Matsushima et al. ........ 358/1.16 |

FOREIGN PATENT DOCUMENTS

| JP | 09-006688 | 1/1997 |
| JP | 2001-051894 | 2/2001 |
| JP | 2007-226602 | 6/2007 |

* cited by examiner

*Primary Examiner* — Cheng-Yuan Tseng
*Assistant Examiner* — Kamal Dewan
(74) *Attorney, Agent, or Firm* — McDonnell Boehnen Hulbert & Berghoff LLP (57) ABSTRACT

Provided is an image forming apparatus, including a nonvolatile memory writing unit configured to write into the nonvolatile memory, at every predetermined time period in which change data is written into the volatile memory within that predetermined time period, the change data written into the volatile memory, a temporary area writing unit configured to write new change data into a temporary area while a primary area writing unit is writing any change data into the primary area, and a primary area transfer unit configured to transfer any change data written into the temporary area by the temporary area writing unit to the primary area when the primary area writing unit completes writing the change data into the primary area.

21 Claims, 8 Drawing Sheets

IMAGE FORMING APPARATUS AND NONVOLATILE MEMORY WRITING METHOD

REFERENCE TO RELATED APPLICATIONS

This application is based upon and claims the benefit of priority from corresponding Japanese Patent Application No. 2009-297073, filed Dec. 28, 2009, now Japanese Patent No. JP5091940, which issued on Dec. 5, 2012, the entire contents of which are incorporated herein by reference.

BACKGROUND

1. Field of the Invention

The present invention relates to an image forming apparatus in which writing apparatus data is written into a nonvolatile memory.

2. Description of the Related Art

In a typical current image forming apparatus, when apparatus data is changed, the changed apparatus data is written into a volatile memory (e.g. a synchronous dynamic random access memory (SDRAM)), with a copy also being written into a nonvolatile memory (e.g. a flash read only memory (ROM)).

Each time the apparatus data is changed, the apparatus data is written into the flash ROM. Therefore, the number of flash ROM writing operations reaches the limit of rewritable times of the flash ROM before the image forming apparatus itself reaches the end of its product life cycle; thus, the flash ROM may not be able to retain the apparatus data. In an attempt to solve this problem, one known image forming apparatus writes change data into the volatile memory, and then the change data written in the volatile memory is written into the flash ROM only at a predetermined time periods. However, if the apparatus data is frequently changed, the writing of the next change data may occur while the change data is being written into the flash ROM because writing into the flash ROM takes some time. In this case, the next change in apparatus data may not be written correctly. Therefore, there is a demand for an image forming apparatus capable of writing a change in apparatus data into the nonvolatile memory while reducing the number of writing operations with respect to the nonvolatile memory.

SUMMARY

The present disclosure provides an image forming apparatus including a volatile memory into which change data is written, a nonvolatile memory into which the change data is written, a control unit configured to write the first change data into the volatile memory each time the apparatus data under the first category has been changed and retain, in the volatile memory at every predetermined time period, the first change data that is most recently written into the volatile memory within that predetermined time period, and a nonvolatile memory writing unit configured to write into the nonvolatile memory, at every predetermined time period in which the change data is written into the volatile memory within that predetermined time period, the change data retained in the volatile memory within that predetermined time period, wherein the nonvolatile memory writing unit starts writing, at the end of the predetermined time period, the first change data retained in the volatile memory, wherein the nonvolatile memory writing unit writes the first change data simultaneously with and independent of writing and retaining by the control unit, and wherein the nonvolatile memory writing unit avoids writing the apparatus data within the predetermined time period into the nonvolatile memory if the first change data is not retained in the volatile memory within the predetermined time period. The change data represents apparatus data that has been changed. The nonvolatile memory includes a plurality of master planes that serve as a primary area into which the change data is to be primarily written and a plurality of sub planes that serves as a temporary area into which the change data is temporarily written. The nonvolatile memory writing unit includes a primary area writing unit configured to write the change data into the master plane, a temporary area writing unit configured to write the change data into the first sub plane, and a primary area transfer unit configured to transfer the change data written in the first sub plane to the master plane. Furthermore, the temporary area writing unit is configured to write new change data into the second sub plane while the primary area writing unit is writing any change data into the master plane. In addition, the primary area transfer unit is configured to transfer any change data written into the second sub plane by the sub plane writing unit to the master plane when the primary area writing unit completes writing the change data into the master plane.

The present disclosure also provides a nonvolatile memory writing method for an apparatus. The apparatus includes a volatile memory into which change data representing apparatus data that has been changed is written at an occurrence of each change, and a nonvolatile memory into which the change data is written. The nonvolatile memory includes a plurality of master planes that serves as a primary area into which the change data is to be primarily written and a plurality of sub planes that serves as a temporary area into which the change data is temporarily written. The nonvolatile memory writing method includes writing the first change data into the volatile memory each time the apparatus data under the first category has been changed, retaining, in the volatile memory at every predetermined time period, the first change data that is most recently written into the volatile memory within that predetermined time period, writing into the nonvolatile memory, at every predetermined time period, the change data retained in the volatile memory within that predetermined time period, and avoiding writing the apparatus data within the predetermined time period into the nonvolatile memory if the first change data is not retained in the volatile memory within the predetermined time period. The change data is written into the master plane and new change data is written into the sub plane while any change data is being written into the master plane. The change data written into the sub plane is transferred to the master plane upon completion of writing the change data into the master plane.

The present disclosure also provides a method of writing apparatus data into a nonvolatile memory. The method includes writing first change data into the volatile memory each time the apparatus data under a first category has been changed, retaining, in the volatile memory at every time period, the first change data that is most recently written into the volatile memory within a predetermined time period, and upon conclusion of each of a plurality of recurring time periods, (a) determining whether apparatus data has been changed by determining whether a volatile memory retains the change data corresponding to apparatus data that has been most recently changed within the predetermined time period, and (b) upon determining that the apparatus data has been changed within the predetermined time period, writing, into the nonvolatile memory, the change data retained in the volatile memory, and (c) avoiding writing the apparatus data within the predetermined time period into the nonvolatile memory if the apparatus data has not been changed within the predetermined time period, wherein writing the change data into the nonvolatile memory includes starting writing, at the end of the predetermined time period, the first change data retained in the volatile memory, writing the first change data simultaneously with and independent of writing and retaining into the volatile memory, writing the change data into a sub plane of the nonvolatile memory and subsequently transferring the written change data from the sub plane to a master plane of the nonvolatile memory.

Additional features and advantages are described herein, and will be apparent from the following Detailed Description and the figures.

BRIEF DESCRIPTION OF THE DRAWINGS

In the accompanying drawings:

FIG. 8 is a flowchart illustrating an operation of the multifunction peripheral when the apparatus data is recovered at a time of power on.

DETAILED DESCRIPTION

Hereinafter, an embodiment of the present disclosure is described with reference to the accompanying drawings.

Figure 1:
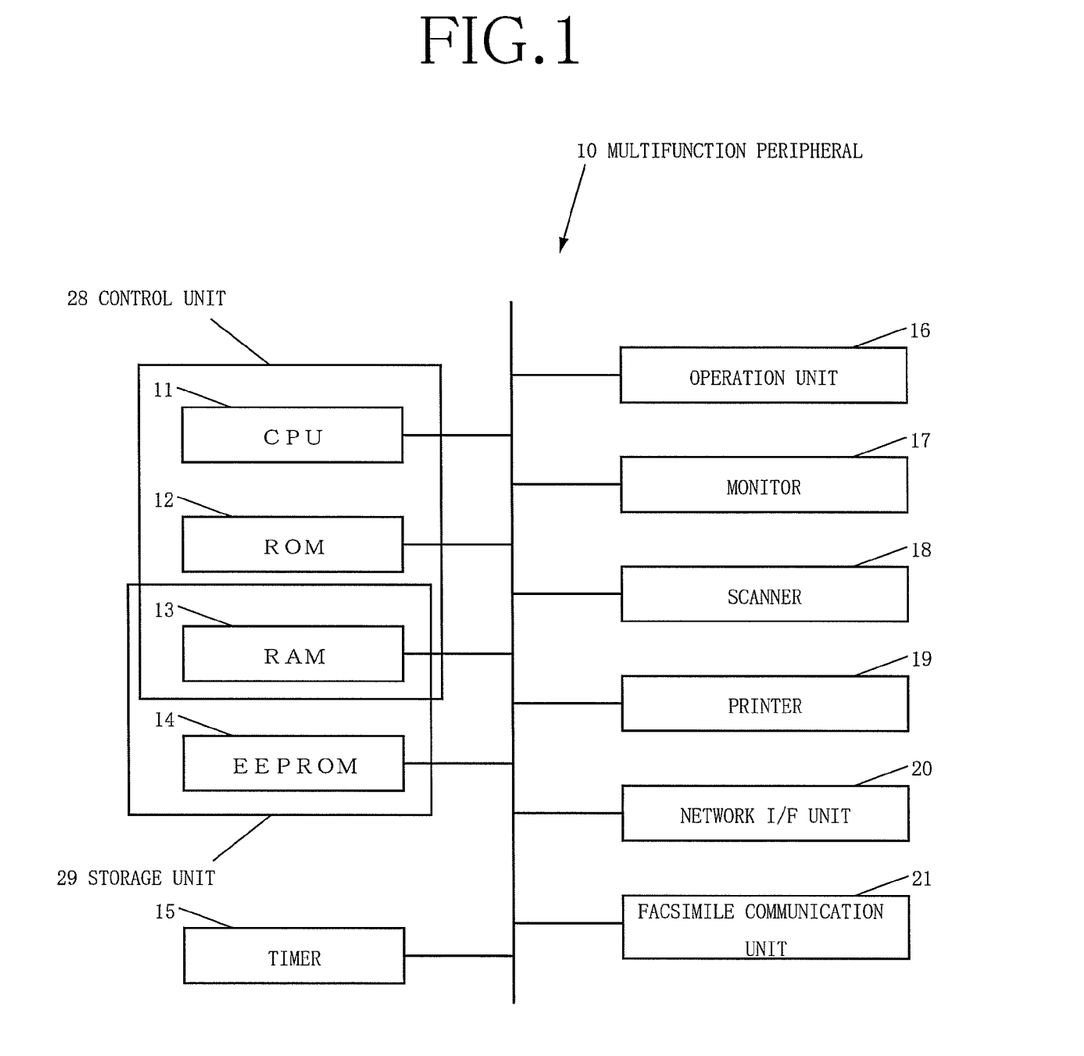
FIG. 1 is a block diagram illustrating a configuration of a multifunction peripheral according to an embodiment of the present disclosure.

First described is a multifunction peripheral serving as an image forming apparatus according to this embodiment. FIG. 1 is a block diagram illustrating a configuration of a multifunction peripheral 10 according to this embodiment.

As illustrated in FIG. 1, the multifunction peripheral 10 includes a central processing unit (CPU) 11, a ROM 12 that previously stores a program and various kinds of data, a RAM 13, serving as a volatile memory, which is used as a work area of the CPU 11, an EEPROM 14, serving as a rewritable nonvolatile memory, which stores various kinds of data, a timer 15 that measures time, an operation unit 16 on an operation panel through which various kinds of operations are input by a user, a monitor 17 on the operation panel that displays various kinds of information, a scanner 18 that reads an image, a printer 19 that prints by executing a print job, a network interface (I/F) unit 20 used for communicating with an external apparatus such as a host computer via a local area network (LAN), and a facsimile communication unit 21 used for performing facsimile communications with an external facsimile apparatus (not illustrated) via a communication line such as a public telephone line.

A control unit 28, which is a computer that controls an entirety of the multifunction peripheral 10, includes, for example, the CPU 11, the ROM 12, and the RAM 13. The CPU 11 is a processor that causes the control unit 28 to operate by executing the programs stored in the ROM 12. The RAM 13 temporarily stores the program and the various kinds of data when the program is executed by the CPU 11.

A storage unit 29, which stores various kinds of information on the multifunction peripheral 10, includes, for example, the RAM 13 and the EEPROM 14.

The operation unit 16 is an input device including buttons that form a touch panel together with the monitor 17 and buttons on the operation panel.

The monitor 17 is, for example, a display device including a liquid crystal display (LCD).

The scanner 18 is a reading device that reads image data from an original.

The printer 19 is a printing device that prints by executing various kinds of print jobs such as a print job for print data received from the external apparatus via the network I/F unit 20, a print job for FAX data received from the external facsimile apparatus via the facsimile communication unit 21, and a print job for image data read by the scanner 18. The printer 19 prints by executing a print job for which an image has been input to the storage unit 29.

The network I/F unit 20, for example, transmits the image data read by the scanner 18 to the external apparatus via the LAN and receives the print data to be printed by the printer 19 from the external apparatus via the LAN.

The facsimile communication unit 21, for example, transmits by FAX the image data read by the scanner 18 to the external facsimile apparatus via the communication line and receives by FAX the print data to be printed by the printer 19 from the external facsimile apparatus via the communication line.

Figure 2:
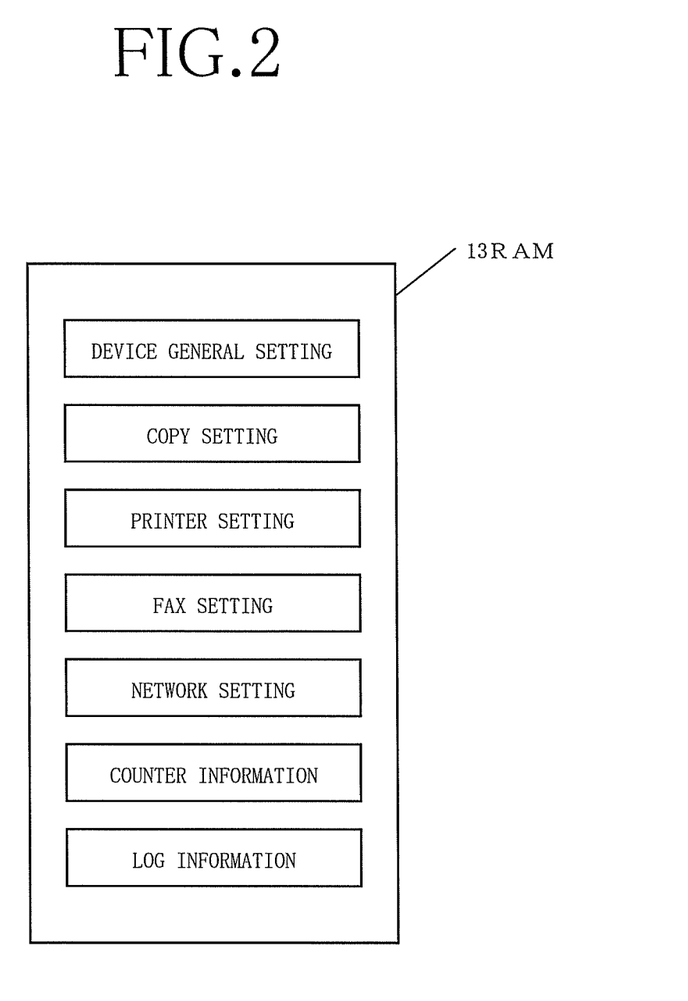
FIG. 2 is a diagram illustrating apparatus data stored in a random access memory (RAM)

FIG. 2 is a diagram illustrating apparatus data stored in the RAM 13.

As illustrated in FIG. 2, the RAM 13 stores several categories of apparatus data on the multifunction peripheral 10.

Examples of the categories of the apparatus data include a "device general setting" category that is a category of setting data generally applied across a plurality of functions of the multifunction peripheral 10, a "copy setting" category that is a category of setting data on a copy function of the multifunction peripheral 10, a "printer setting" category that is a category of setting data on a printer function of the multifunction peripheral 10, a "FAX setting" category that is a category of setting data on a FAX function of the multifunction peripheral 10, a "network setting" category that is a category of network-related setting data on the multifunction peripheral 10, a "counter information" category that is a category of counter information on the multifunction peripheral 10, and a "log information" category that is a category of various kinds of records of the multifunction peripheral 10.

The "device general setting" category includes, for example, data on a sheet size of a sheet-feeding cassette and a time of day. The "copy setting" category includes, for example, data on resolution set for image reading performed by the scanner 18. The "printer setting" category includes, for example, font data on characters printed by the printer 19. The "FAX setting" category includes, for example, data on a local number. The "network setting" category includes, for example, data on an internet protocol (IP) address and a media access control (MAC) address. The "counter information" category includes, for example, data on the number of sheets printed by the printer 19. The "log information" category includes, for example, records of print jobs executed for printing by the printer 19 and records of errors that have occurred on the multifunction peripheral 10.

Figure 3:
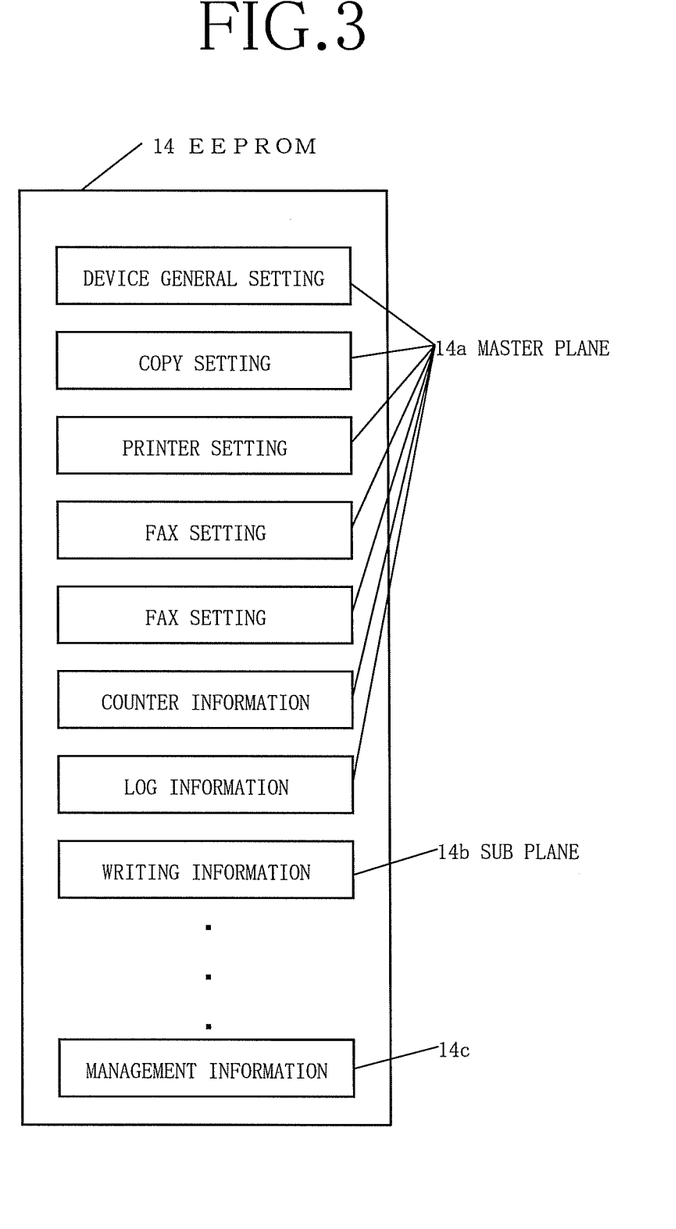
FIG. 3 is a diagram illustrating apparatus data stored in an electrically erasable and programmable read only memory (EEPROM)

FIG. 3 is a diagram illustrating apparatus data stored in the EEPROM 14.

As illustrated in FIG. 3, the EEPROM 14 stores a copy of the apparatus data stored in the RAM 13 for when the multifunction peripheral 10 is powered down. The EEPROM 14 stores the apparatus data under each of the categories of the apparatus data in the same manner as the RAM 13.

The EEPROM 14 includes a plurality of master planes 14a and a plurality of sub planes 14b. The plurality of master planes 14 serve as a primary area into which change data (i.e. the changed apparatus data) is to be written. The plurality of sub planes 14b serve as a temporary area into which the change data is to be written temporarily. Further, the EEPROM 14 stores management information 14c used for managing the plurality of master planes 14a and the plurality of sub planes 14b. The apparatus data under each of the categories of "device general setting", "copy setting", "printer setting", "FAX setting", "network setting", "counter information", and "log information" is stored into one of the master planes 14a. Writing information generated for causing the apparatus data to be written into the master planes 14a is stored into the sub plane 14b. It should be noted that the writing information on the apparatus data under any of the categories may be written into each of the sub planes 14b. The management information 14c is information for managing which of the master planes 14a (i.e. which category) the apparatus data is written in, and which of the sub planes 14b (i.e. which category and which period) the writing information is written in. That is, in the EEPROM 14, which includes an order storage unit according to the present disclosure, an order in which the control unit 28 writes the change data into the plurality of sub planes 14b is stored by the management information 14c.

One of a usable state and a using state is recorded into the RAM 13 for each of the plurality of master planes 14a and the plurality of sub planes 14b. The usable state refers to a state in which the plane can be used for an arbitrary process. The using state refers to a state in which the plane is being used for a specific process and cannot be used for another process.

Next described is an operation of the multifunction peripheral 10.

For each of the categories of the apparatus data, the multifunction peripheral 10 separately monitors whether or not the apparatus data has been changed, writes the change data (i.e. the changed apparatus data) into the EEPROM 14, and recovers the apparatus data when the multifunction peripheral is powered-up. The following describes the apparatus data under the "device general setting" category.

Figure 4:
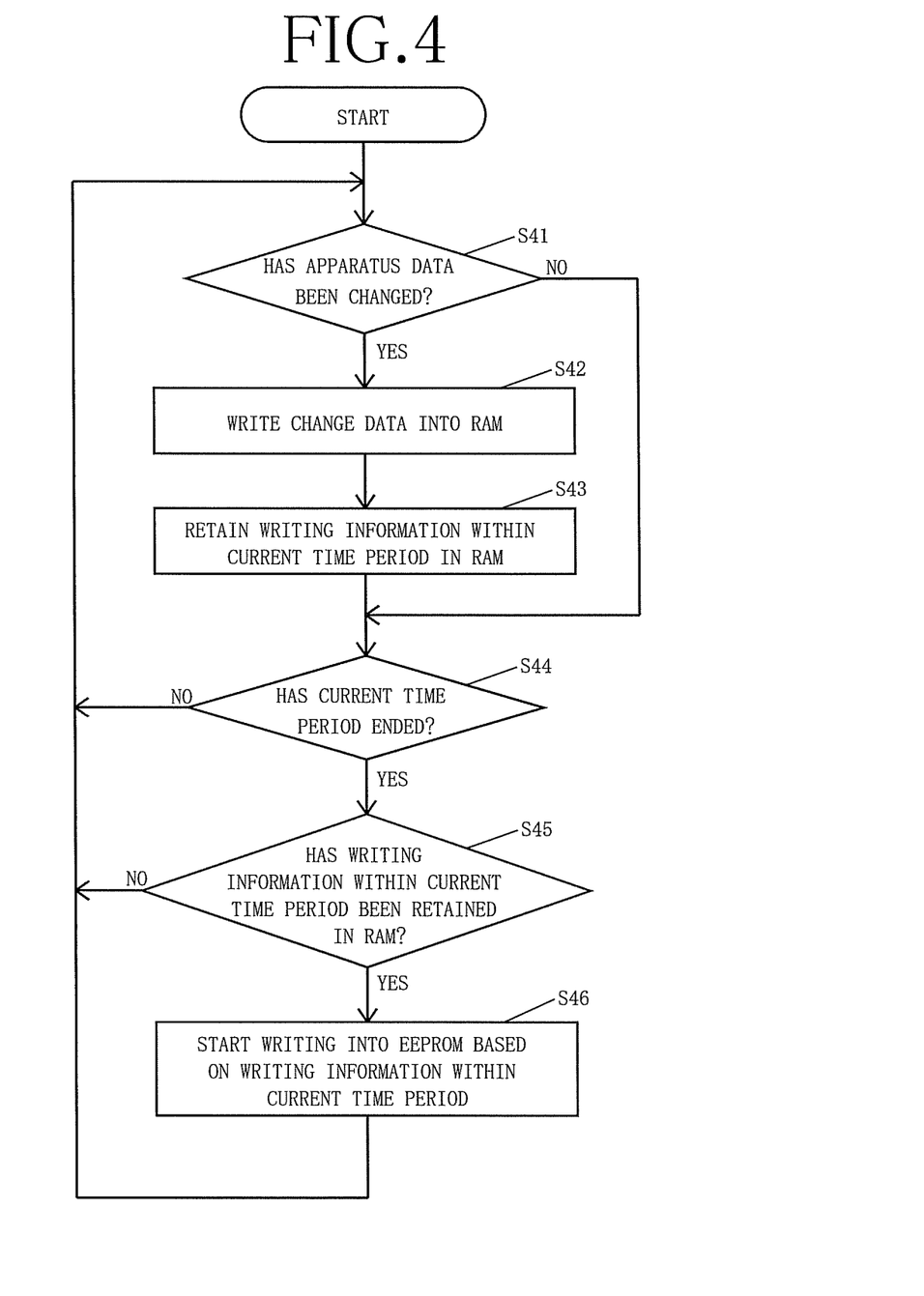
FIG. 4 is a flowchart illustrating an operation of the multifunction peripheral when the multifunction peripheral monitors the apparatus data.

FIG. 4 is a flowchart illustrating an operation of the multifunction peripheral 10 that is performed when the multifunction peripheral 10 monitors whether or not the apparatus data has been changed.

The control unit 28 of the multifunction peripheral 10 obtains a time period of a fixed cycle T as a predetermined time period based on the time measured by the timer 15. The cycle T may be, for example, one second. As illustrated in FIG. 4, first, the control unit 28 determines whether or not the apparatus data under the "device general setting" category has been changed (S41).

Each time the control unit 28 determines in Step S41 that the apparatus data under the "device general setting" category has been changed, the change data is written into the RAM 13 (S42). The control unit 28 retains the entirety of the apparatus data under the "device general setting" category including the change data in the RAM 13 as the writing information under the "device general setting" category within the current time period (S43). After that, the control unit 28 determines whether or not the current time period has ended (S44). Meanwhile, if the control unit 28 determines in Step S41 that the apparatus data under the "device general setting" category has not been changed, the control unit 28 determines whether or not the current time period has ended without the process of Steps S42 and S43 (S44). If, in Step S44, it is determined that the current time period has not been ended, the control unit 28 returns to the process of Step S41 again. If the apparatus data under the "device general setting" category has been changed a plurality of times within the same time period, the control unit 28 retains the entirety of the apparatus data under the "device general setting" category including the most recent change data in the RAM 13 as the writing information under the "device general setting" category within the current time period.

If, in Step S44, it is determined that the current time period has ended, the control unit 28 determines whether or not the writing information under the "device general setting" category within the current time period is retained in the RAM 13 (S45).

If, in Step S45, it is determined that the writing information under the "device general setting" category within the current time period is retained in the RAM 13, the control unit 28 starts writing into the EEPROM 14 based on the writing information under the "device general setting" category within the current time period (S46). Then, the control unit 28 returns to the process of Step S41 as the process for the next time period. Meanwhile, if, in Step S45, it is determined that the writing information under the "device general setting" category within the current time period is not retained in the RAM 13, the control unit 28 returns to the process of Step S41 again as the process for the next time period without the process of Step S46. Thus, when the change data is written into the RAM 13 within the time period of the cycle T, the control unit 28 writes the writing information including the change data written into the RAM 13 within the time period of the cycle T into the EEPROM 14 every time period of the cycle T. The control unit 28 constitutes a nonvolatile memory writing unit according to the present disclosure.

Figure 5:
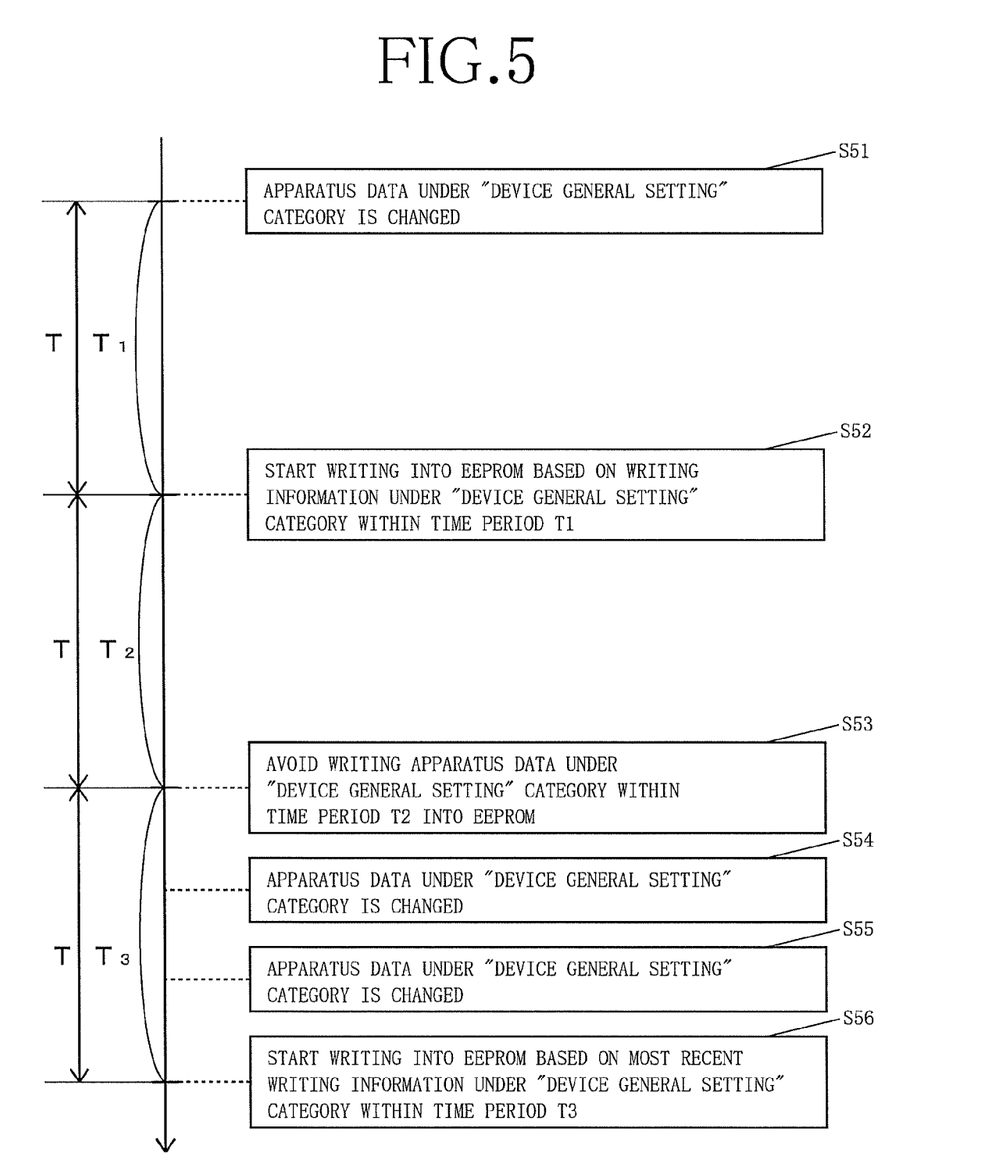
FIG. 5 is a diagram illustrating a specific example of the operation illustrated in FIG. 4.

FIG. 5 is a diagram illustrating a specific example of the operation illustrated in FIG. 4.

As illustrated in FIG. 5, time periods $T_1$, $T_2$, and $T_3$ are each a time period of the fixed cycle T.

In the specific example illustrated in FIG. 5, if the apparatus data under the "device general setting" category is changed within the time period $T_1$ (S51), the control unit 28 writes the change data into the RAM 13 (S42). Further, the control unit 28 retains the entirety of the apparatus data under the "device general setting" category including the change data in the RAM 13 as the writing information under the "device general setting" category within the time period $T_1$ (S43).

At the end of the time period $T_1$, the writing information under the "device general setting" category within the time period $T_1$ is retained in the RAM 13, and hence the control unit 28 starts the writing into the EEPROM 14 based on the writing information under the "device general setting" category within the current time period (S46). That is, the control unit 28 starts writing into the EEPROM 14 based on the writing information under the "device general setting" category within the time period $T_1$ retained in the RAM 13 (S52).

In the specific example of FIG. 5, the apparatus data under the "device general setting" category is not changed during the time period $T_2$. Therefore, at the end of the time period $T_2$, the writing information under the "device general setting" category within the time period $T_2$ is not retained in the RAM 13, and hence the control unit 28 avoids writing the apparatus data under the "device general setting" category within the time period $T_2$ into the EEPROM 14 (S53).

If the apparatus data under the "device general setting" category is changed within the time period $T_3$ (S54), the control unit 28 writes the change data into the RAM 13 (S42). The control unit 28 retains the entirety of the apparatus data under the "device general setting" category including the change data in the RAM 13 as the writing information under the "device general setting" category within the time period $T_3$ (S43).

Subsequently, if the apparatus data under the "device general setting" category is changed for a second time within the time period $T_3$ (S55), the control unit 28 writes the change data into the RAM 13 (S42). The control unit 28 retains the entirety of the apparatus data under the "device general setting" category including the most recent change data in the RAM 13 as the writing information under the "device general setting" category within the time period $T_3$ (S43).

At the end of the time period $T_3$, the writing information under the "device general setting" category within the time period $T_3$ is retained in the RAM 13, and hence the control unit 28 starts the writing into the EEPROM 14 based on the writing information under the "device general setting" category within the current time period (S46). That is, the control unit 28 starts the writing into the EEPROM 14 based on the most recent writing information under the "device general setting" category within the time period $T_3$ retained in the RAM 13 (S56).

As described above, a time period, between when the control unit 28 has started writing into the EEPROM 14 until the control unit 28 next starts writing into the EEPROM 14, is always a natural number multiple of the cycle T. Thus, at most, the control unit 28 writes into the EEPROM 14 every cycle T.

Figure 6:
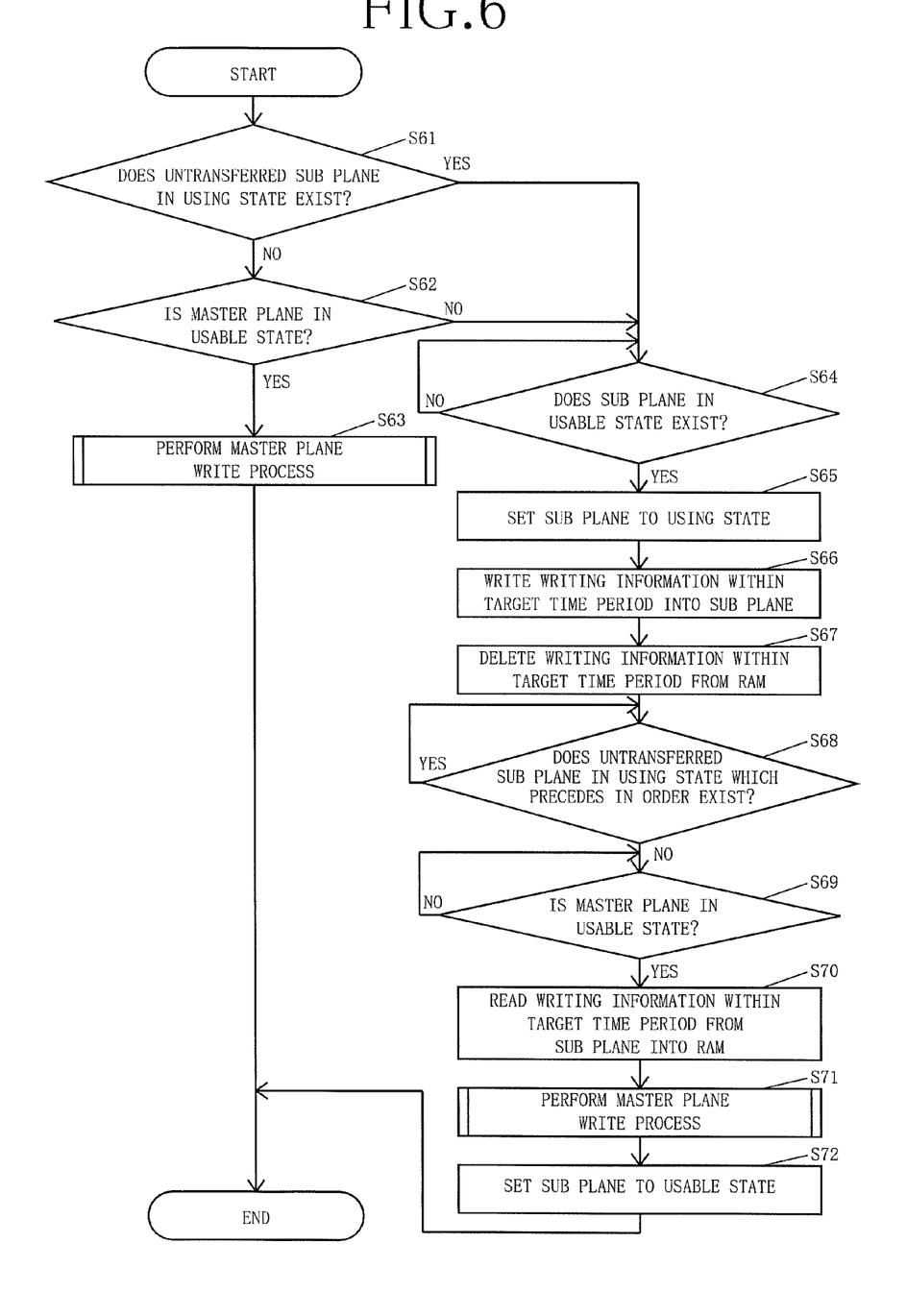
FIG. 6 is a flowchart illustrating an operation of the multifunction peripheral when change data is written into the EEPROM.

FIG. 6 is a flowchart illustrating an operation of the multifunction peripheral 10 that is performed when change data is written into the EEPROM 14. The process illustrated in FIG. 6 is what is performed at Step S46 of FIG. 4, when the control unit 28 starts writing into the EEPROM 14 based on the writing information under the "device general setting" category. The control unit 28 performs the process illustrated in FIG. 6 simultaneously with and independent of the process illustrated in FIG. 4. Further, the control unit 28 can perform a plurality of simultaneous processes illustrated in FIG. 6 independently from one another.

In the process illustrated in FIG. 6, the control unit 28 first determines whether or not an untransferred sub plane 14b in the using state exists for the apparatus data under the "device general setting" category (S61). The untransferred sub plane 14b refers to the sub plane 14b from which the change data has not been transferred to the master plane 14a yet. The untransferred sub plane 14b constitutes a temporary area in which written data has not yet been transferred, according to the present disclosure.

If, in Step S61, it is determined that the untransferred sub plane 14b in the using state does not exist for the apparatus data under the "device general setting" category, the control unit 28 determines whether or not the master plane 14a, in which the apparatus data under the "device general setting" category is stored, is in the usable state (S62).

Figure 7:
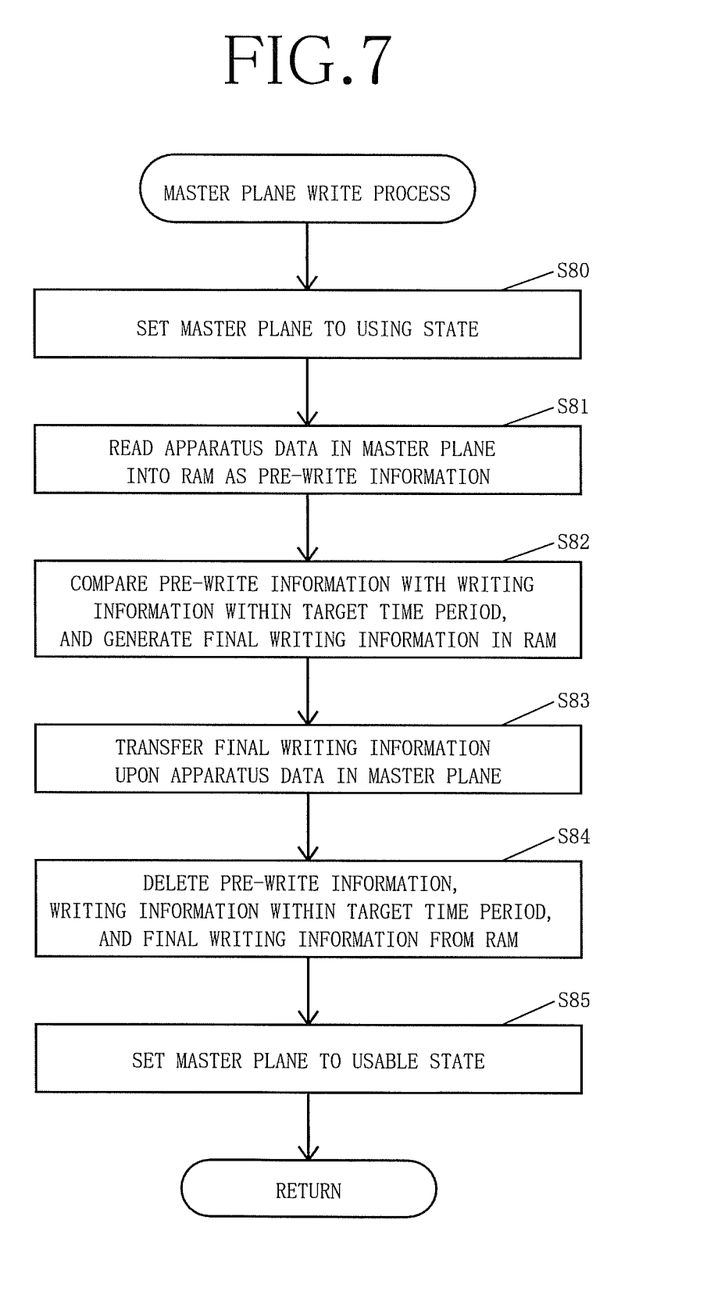
FIG. 7 is a flowchart illustrating a master plane writing process.

If, in Step S62, it is determined that the master plane 14a in which the apparatus data under the "device general setting" category is stored is in the usable state, the control unit 28 executes a master plane writing process illustrated in FIG. 7 (S63). Thus, the control unit 28 writes the change data into the master plane 14a. The control unit 28 constitutes a primary area writing unit according to the present disclosure.

FIG. 7 is a flowchart illustrating the master plane writing process of the flowchart illustrated in FIG. 6.

As illustrated in FIG. 7, the control unit 28 sets the master plane 14a under the "device general setting" category to the using state (S80). The control unit 28 reads the entirety of the apparatus data in the master plane 14a under the "device general setting" category into the RAM 13 as pre-write information (S81).

Subsequently, the control unit 28 compares the pre-write information in Step S81 with the writing information under the "device general setting" category within a target time period stored in the RAM 13, and generates final writing information in the RAM 13 (S82). Here, the target time period refers to a time period for the writing information illustrated in FIG. 4 that has caused the process illustrated in FIG. 6 to be started. For example, the target time period of the process illustrated in FIG. 6 started at the end of the time period $T_1$ is the time period $T_1$, and the target time period of the process illustrated in FIG. 6 started at the end of the time period $T_3$ is the time period $T_3$. The final writing information refers to data having a minimum necessary size to write the change data into the master plane 14a, and is decided according to a minimum write unit of a write-target nonvolatile memory. For example, the minimum write unit of the nonvolatile memory may be 1 byte if the nonvolatile memory is an EEPROM as in this embodiment, while the minimum write unit of the nonvolatile memory may be 1 sector if the nonvolatile memory is a flash ROM.

Subsequently, the control unit 28 transfers the final writing information in the RAM 13 generated in Step S82 upon the apparatus data in the master plane 14a under the "device general setting" category (S83). The control unit 28 deletes the pre-write information under the "device general setting" category read into the RAM 13 in Step S81, the writing information under the "device general setting" category within the target time period stored in the RAM 13, and the final writing information under the "device general setting" category generated in the RAM 13 in Step S82 (S84).

Finally, the control unit 28 sets the master plane 14a under the "device general setting" category to the usable state (S85), and terminates the process illustrated in FIG. 7.

As illustrated in FIG. 6, after executing the master plane writing process in Step S63, the control unit 28 terminates the process illustrated in FIG. 6.

If, in Step S61, it is determined that the untransferred sub plane 14b in the using state exists for the apparatus data under the "device general setting" category, or if, in Step S62, it is determined that the master plane 14a in which the apparatus data under the "device general setting" category is stored is in the using state, then the control unit 28 determines whether or not the sub plane 14b in the usable state exists (S64). If, in Step S64, it is determined that no sub plane 14b with a usable state exists, then the control unit 28 continues executing the process of Step S64 until determining that the sub plane 14b exists in a usable state. It should be noted that the length of the cycle T and the number of the sub planes 14b may be designed for the multifunction peripheral 10 according to the performance of the nonvolatile memory mounted to the multifunction peripheral 10, so that the control unit 28 may not determine in Step S64 that the sub plane 14b in the usable state does not exist.

If, in Step S64, it is determined that the sub plane 14b in the usable state exists, the control unit 28 sets one of the sub planes 14b in the usable state to the using state (S65). The control unit 28 writes the writing information under the "device general setting" category within the target time period stored in the RAM 13 into the sub plane 14b set to the using state in Step S65 (S66). Thus, if the process of writing new change data into the EEPROM 14 occurs while the change data is being written into the master plane 14*a* ("NO" in S62), the control unit 28 writes the new change data into the sub plane 14*b* (S66). When writing the new change data into the EEPROM 14 while the untransferred sub plane 14*b* exists ("YES" in S61), the control unit 28 writes the new change data into a sub plane 14*b* other than the untransferred sub plane 14*b* (S66). The control unit 28 thus constitutes a temporary area writing unit according to the present disclosure. It should be noted that, in the process of Step S66, the control unit 28 writes into the management information 14*c* correspondence information between the sub plane 14*b* in which the writing information is written and the target time period and the category of the writing information written in the sub plane 14*b*.

Subsequently, the control unit 28 deletes the writing information under the "device general setting" category within the target time period stored in the RAM 13 (S67). The control unit 28 determines whether or not the untransferred sub plane 14*b* in the using state that precedes in order exists for the apparatus data under the "device general setting" category (S68). If it is determined that in Step S68 that the untransferred sub plane 14*b* in the using state that precedes in order exists, the control unit 28 continues executing the process of Step S68 until the control unit 28 determines that the untransferred sub plane 14*b* in the using state that precedes in the order does not exist. Here, the sub plane 14*b* that precedes in the order refers to the sub plane 14*b* in which the writing information within the time period before the target time period is stored under the corresponding category.

If, in Step S68, it is determined that the untransferred sub plane 14*b* in the using state that precedes in the order does not exist for the apparatus data under the "device general setting" category, the control unit 28 determines whether or not the master plane 14*a* in which the apparatus data under the "device general setting" category is stored is in the usable state (S69). If, in Step S69, it is determined that the master plane 14*a* in which the apparatus data is stored is in the using state, the control unit 28 continues executing the process of Step S69 until the control unit 28 determines that the master plane 14*a* in which the apparatus data is stored is in the usable state.

If, in Step S69, it is determined that the master plane 14*a* in which the apparatus data under the "device general setting" category is stored is in the usable state, the control unit 28 reads the writing information under the "device general setting" category within the target time period written into the sub plane 14*b* in Step S66 into the RAM 13 (S70). The control unit 28 executes the master plane writing process illustrated in FIG. 7 (S71). Thus, if there is no other untransferred sub plane 14*b* that precedes in order the sub plane 14*b* in which the writing information within the target time period is stored (i.e. sub plane 14*b* from which the change data is transferred to the master plane 14*a*) (S68), then when the writing of the change data into the master plane 14*a* is completed (S69), the control unit 28 transfers the change data included in the writing information written in the target sub plane 14*b* upon the master plane 14*a* (S71). The control unit 28 thus constitutes a primary area transfer unit according to the present disclosure.

When executing the master plane writing process in Step S71, the control unit 28 sets to the usable state (S72) the sub plane 14*b* previously set to the using state in Step S65, and terminates the process illustrated in FIG. 6. The control unit 28 deletes from the management information 14*c* the correspondence information between the sub plane 14*b* set to the usable state in the process of Step S72 and the target time period and the category of the writing information written in the sub plane 14*b*.

As described above, if the new change data is written into the EEPROM 14 while the change data is being written into the master plane 14*a* ("NO" in S62), the control unit 28 writes the writing information including new change data into the sub plane 14*b* (S66). Then, when the writing of the change data into the master plane 14*a* is completed ("YES" in S69), the control unit 28 transfers the change data included in the writing information written in the target sub plane 14*b* upon the master plane 14*a* (S71).

Further, when writing the new change data into the EEPROM 14 while the untransferred sub plane 14*b* exists ("YES" in S61), the control unit 28 writes the writing information including the new change data into the sub plane 14*b* other than the untransferred sub plane 14*b* (S66). Then, if there is no other untransferred sub plane 14*b* that precedes in the order ("NO" in S68), and when the writing of the change data into the master plane 14*a* is completed ("YES" in S69), the control unit 28 transfers the change data included in the writing information written in the sub plane 14*b* upon the master plane 14*a* (S71).

Figure 8:
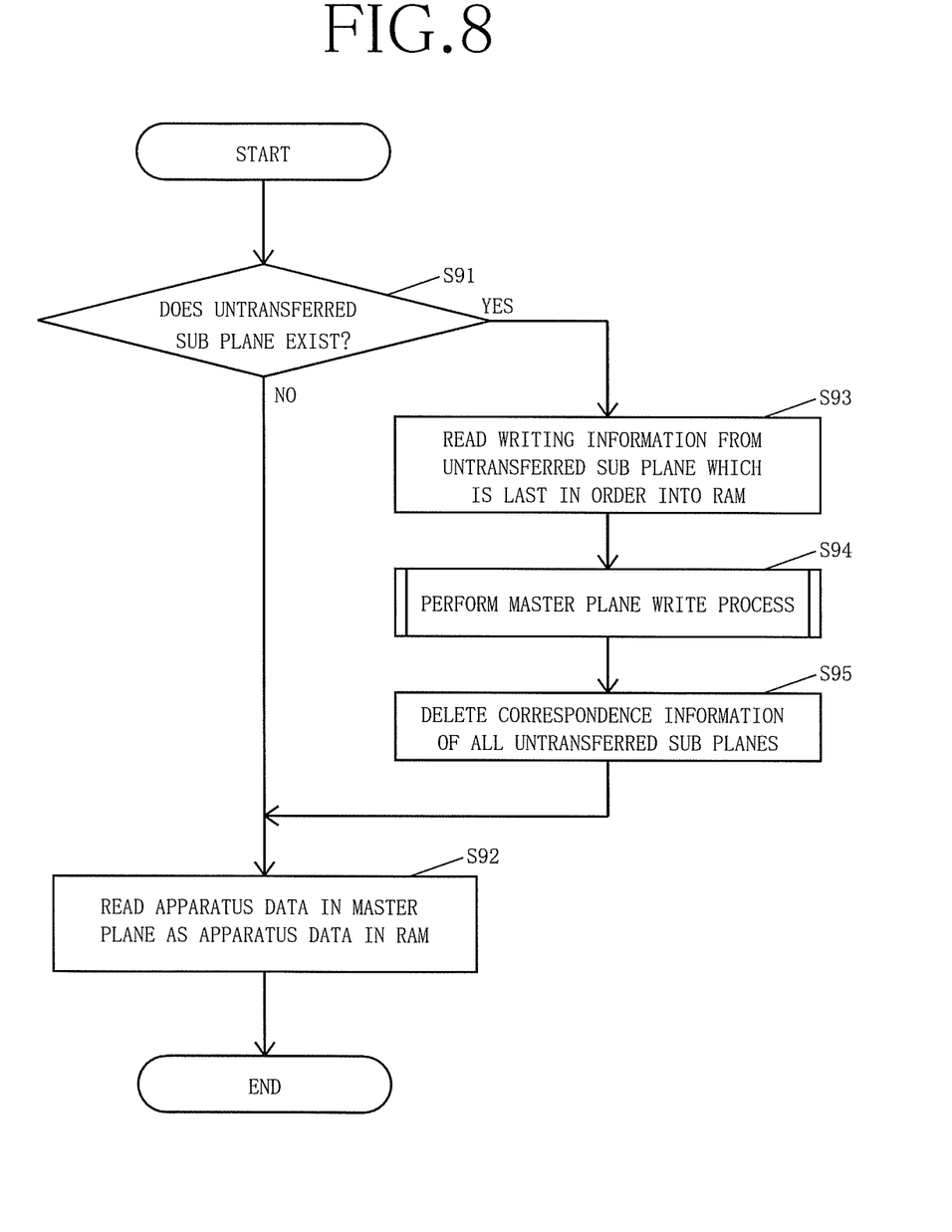

FIG. 8 is a flowchart illustrating an operation of the multifunction peripheral 10 that is performed when the apparatus data is recovered at the time of power on.

When the power of the multifunction peripheral 10 is turned on, the control unit 28 determines whether or not the untransferred sub plane 14*b* exists under the "device general setting" category as illustrated in FIG. 8 (S91). Here, based on the correspondence information on the management information 14*c* in the EEPROM 14, the control unit 28 determines that the untransferred sub plane 14*b* exists under the "device general setting" category when the sub plane 14*b* in which the writing information under the "device general setting" category is stored exists.

If it is determined in Step S91 that the untransferred sub plane 14*b* does not exist under the "device general setting" category, that is, the sub plane 14*b* in which the writing information under the "device general setting" category is stored does not exist, the control unit 28 reads the apparatus data in the master plane 14*a* under the "device general setting" category as the apparatus data under the "device general setting" category in the RAM 13 (S92), and terminates the process illustrated in FIG. 8.

If it is determined in Step S91 that the untransferred sub plane 14*b* exists under the "device general setting" category, that is, the sub plane 14*b* in which the writing information under the "device general setting" category is stored exists, the control unit 28 reads the writing information from the untransferred sub plane 14*b* that is last in order under the "device general setting" category into the RAM 13 (S93). Here, the sub plane 14*b* that is last in order refers to the sub plane 14*b* in which the most recent writing information is stored. Based on the correspondence information on the management information 14*c*, the control unit 28 identifies the sub plane 14*b* within the newest target time period among the sub planes 14*b* in which the writing information under the "device general setting" category is stored, as the sub plane 14*b* that is last in the order.

Subsequently, the control unit 28 executes the master plane writing process illustrated in FIG. 7 (S94), and deletes the correspondence information between all the untransferred sub planes 14*b* under the "device general setting" category and the target time period and the category of the writing information written in the sub planes 14*b*, from the management information 14*c* (S95).

Finally, the control unit 28 performs the process of Step S92, and then terminates the process illustrated in FIG. 8. The control unit 28 thus constitutes a power-on time transfer unit according to the present disclosure.

As described above, when the change data is written into the RAM 13 within the time period of the cycle T, the multifunction peripheral 10 performs the process of writing the change data written into the RAM 13 within the time period into the EEPROM 14 every time period. This can prevent the change data from being written into the EEPROM 14 each time the apparatus data is changed, and can reduce the number of writing operations with respect to the EEPROM 14. Therefore, the multifunction peripheral 10 can prevent the number of writing operations with respect to the EEPROM 14 from reaching the limit of rewritable times of the EEPROM 14 before the multifunction peripheral 10 itself reaches the end of its product life cycle. For example, when the apparatus data stored in the RAM 13 and in the master plane 14*a* of the EEPROM 14 is reset to factory-default apparatus data stored in the ROM 12, even if the factory-default apparatus data may have several thousand items or more, the multifunction peripheral 10 collectively writes the items into the EEPROM 14 every time period of the cycle T instead of writing the item into the EEPROM 14 each time the item is reset. This can effectively suppress the number of writing operations with respect to the EEPROM 14.

The multifunction peripheral 10 includes the plurality of sub planes 14*b*, and hence, in comparison with a configuration including only one sub plane 14*b*, it is possible to shorten intervals at which the process of writing the change data written in the RAM 13 into the EEPROM 14 is performed.

The multifunction peripheral 10 can reduce an amount of the apparatus data written into the EEPROM 14 every time period of the cycle T because the EEPROM 14 stores the apparatus data under each of the categories of the apparatus data and the control unit 28 handles the apparatus data for each of the categories.

The multifunction peripheral 10 can adjust the cycle T according to the performance of the nonvolatile memory such as a time necessary for writing into the nonvolatile memory and a timing at which the writing into the nonvolatile memory can be performed. Therefore, by adjusting the length of the cycle T to a minimum necessary length according to the performance of the nonvolatile memory mounted to the multifunction peripheral 10, a manufacturer of the multifunction peripheral 10 can reduce the amount of the change data that cannot be saved when the power of the multifunction peripheral 10 is turned off suddenly.

The multifunction peripheral 10 writes the new change data into the sub plane 14*b* while writing the change data into the master plane 14*a*. Therefore, even when the change data is being written into the master plane 14*a*, it is possible to write the new change data into the EEPROM 14. In the same manner, while writing the change data into the sub plane 14*b*, the multifunction peripheral 10 writes the new change data into another sub plane 14*b*. Therefore, even when the change data is being written into the sub plane 14*b*, it is possible to write the new change data into the EEPROM 14.

When transferring the change data written in the sub plane 14*b* to the master plane 14*a*, the multifunction peripheral 10 always transfers the change data written in the untransferred sub plane 14*b* that precedes in order first. Therefore, it is possible to avoid overwriting new change data with old change data in the master plane 14*a*.

In the multifunction peripheral 10, when the change data written in the sub plane 14*b* is not yet transferred to the master plane 14*a* at the time of power on of the multifunction peripheral 10, the control unit 28 transfers the change data written in the sub plane 14*b* upon the RAM 13. Therefore, even if the power of the multifunction peripheral 10 is turned off when the change data written in the sub plane 14*b* is not yet transferred to the master plane 14*a*, it is possible to transfer the change data written in the sub plane 14*b* to the RAM 13 at the time of power on of the multifunction peripheral 10.

When the untransferred sub plane 14*b* exists at the time of power on of the multifunction peripheral 10, the multifunction peripheral 10 transfers the change data written in the untransferred sub plane 14*b* that is last in order to the RAM 13. Therefore, if the power of the multifunction peripheral 10 is turned off when there is a plurality of untransferred sub planes 14*b*, it is possible to transfer the most recent change data written in the untransferred sub plane 14*b* to the RAM 13 in a shorter period of time than in a configuration in which the change data written in the untransferred sub plane 14*b* is transferred to the RAM 13 in order.

The present disclosure includes various other embodiments. For example, other designs can be used in which the above-described components are each performed.

The image forming apparatus according to the present disclosure is described as the multifunction peripheral in this embodiment, but may be an image forming apparatus other than the multifunction peripheral, such as a copier, a printer, or a facsimile apparatus.

The nonvolatile memory according to the present disclosure is described as the EEPROM in this embodiment, but may be a nonvolatile memory other than the EEPROM, such as a flash ROM.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
 a volatile memory into which first change data is written, wherein the first change data represents apparatus data that has been changed, and wherein the first change data is associated with a first category from among a plurality of categories;
 a nonvolatile memory into which the first change data is written;
 a control unit configured to write the first change data into the volatile memory each time the apparatus data under the first category has been changed and retain, in the volatile memory at every predetermined time period, the first change data that is most recently written into the volatile memory within that predetermined time period; and
 a nonvolatile memory writing unit configured to write into the nonvolatile memory, at every predetermined time period in which the first change data is written into the volatile memory within that predetermined time period, the first change data retained in the volatile memory within that predetermined time period,
 wherein the nonvolatile memory writing unit starts writing, at the end of the predetermined time period, the first change data retained in the volatile memory;
 wherein the first change data is retained in the volatile memory after the end of the predetermined time period;

wherein the nonvolatile memory writing unit writes the first change data from the volatile memory simultaneously with and independent of writing and retaining by the control unit, wherein the nonvolatile memory writing unit avoids writing the apparatus data within the predetermined time period into the nonvolatile memory if the first change data is not retained in the volatile memory within the predetermined time period, wherein the nonvolatile memory comprises:

a plurality of master planes that serves as a primary area configured to store change data into which the first change data is to be primarily written, wherein each master plane is associated with a respective category from among the plurality of categories; and a plurality of sub planes that serves as a temporary area into which the first change data is temporarily written, and wherein each sub plane from among the plurality of sub planes is configured to store change data associated with any category from among the plurality of categories, wherein the nonvolatile memory writing unit comprises:

a primary area writing unit configured to write the first change data into a master plane corresponding to the first category;

a temporary area writing unit configured to write the first change data into a first sub plane from among the plurality of sub planes; and a primary area transfer unit configured to transfer the first change data written in the first sub plane to the master plane corresponding to the first category, wherein the temporary area writing unit is further configured to write second change data and a second category associated with the second change data from the volatile memory into a second sub plane from among the plurality of sub planes if the primary area writing unit is writing the first change data into the master plane corresponding to the first category at an end of the predetermined time period, wherein the primary area transfer unit is further configured to transfer the second change data written into the second sub plane by the sub plane writing unit to the master plane associated with the second category when the primary area writing unit completes writing the first change data into the master plane corresponding to the first category, wherein the primary area transfer unit is further configured to transfer the second change data from the volatile memory into the master plane corresponding to the second category if the master plane corresponding to the first category is in a usable state at the end of the predetermined time period, wherein the apparatus data includes a plurality of portions of data, wherein each portion of data corresponds to a category from among the plurality of categories, and wherein each portion of data is stored into a respective plane from among the plurality of master planes.

2. The image forming apparatus according to claim 1, further comprising a power-on time transfer unit configured to transfer the first change data written in the first sub plane to the volatile memory when the sub plane in which the first change data under the first category is stored exists at a time of power on of the image forming apparatus, wherein the power-on time transfer unit is further configured to transfer the first change data from the master plane corresponding to the first category to the volatile memory when the sub plane in which the first change data under the first category is stored does not exist at a time of power on of the image forming apparatus.

3. The image forming apparatus according to claim 2, wherein the image forming apparatus further comprises an order storage unit configured to store an order in which the temporary area writing unit writes change data into the plurality of the sub planes;

wherein the temporary area writing unit is configured to write the second change data into a sub plane from among the plurality of the sub planes other than an untransferred sub plane when writing the second change data into the nonvolatile memory while the untransferred sub plane exists, the untransferred sub plane being one of the plurality of the sub planes from which the first change data has not yet transferred to the master plane corresponding to the first category; and wherein the primary area transfer unit is configured to transfer the first change data written in a target sub plane to the master plane corresponding to the first category when the untransferred sub plane which precedes in the order the target sub plane does not exist.

4. The image forming apparatus according to claim 3, further comprising a power-on time transfer unit configured to transfer the first change data written in the untransferred sub plane that is last in the order to the volatile memory when the untransferred sub plane exists at a time of power on of the image forming apparatus.

5. The image forming apparatus according to claim 3, wherein the temporary area writing unit is configured to wait until any one of the plurality of sub planes becomes usable if a usable sub plane does not exist when writing the second change data into the nonvolatile memory while the untransferred sub plane exists.

6. The image forming apparatus according to claim 1, wherein:

the volatile memory and the nonvolatile memory store the apparatus data under corresponding categories of the apparatus data; and the nonvolatile memory writing unit is configured to handle the apparatus data for the each of the categories.

7. The image forming apparatus according to claim 6, wherein the nonvolatile memory comprises management information used for managing the categories of the apparatus data stored in the master plane and the sub plane.

8. The image forming apparatus according to claim 1, further comprising a control unit configured to delete the first change data in the volatile memory, wherein the control unit is further configured to delete the first change data that is retained in the volatile memory within the predetermined time period if the first change data that is retained in the volatile memory within the predetermined time period is written in the nonvolatile memory.

9. The image forming apparatus according to claim 1, wherein the volatile memory has one of a usable state and a using state recorded in each of the master plane and the sub plane.

10. A nonvolatile memory writing method for an apparatus, the apparatus comprising:

a volatile memory into which first change data representing apparatus data that has been changed is written at an occurrence of each change, wherein the first change data is associated with a first category from among a plurality of categories; and a nonvolatile memory into which the first change data is written, wherein the nonvolatile memory comprises:
a plurality of master planes that serves as a primary area configured to store change data into which the first change data is to be primarily written, wherein each master plane is associated with a respective category from among the plurality of categories; and
a plurality of sub planes that serves as a temporary area into which the first change data is temporarily written, and wherein each sub plane from among the plurality of sub planes is configured to store change data associated with any category from among the plurality of categories,
wherein the nonvolatile memory writing method comprises:
writing the first change data into the volatile memory each time the apparatus data under the first category has been changed;
retaining, in the volatile memory at every predetermined time period, the first change data that is most recently written into the volatile memory within that predetermined time period;
retaining the first change data in the volatile memory after that predetermined time period;
writing into the nonvolatile memory, at every predetermined time period in which the first change data is written into the volatile memory within that predetermined time period, the first change data retained in the volatile memory within that predetermined time period; and
avoiding writing the apparatus data within the predetermined time period into the nonvolatile memory if the first change data is not retained in the volatile memory within the predetermined time period
wherein writing the first change data into the nonvolatile memory comprises:
starting writing, at the end of the predetermined time period, the first change data retained in the volatile memory;
writing the first change data from the volatile memory simultaneously with and independent of writing and retaining into the volatile memory;
writing the first change data into the master plane corresponding to the first category;
writing second change data and a second category associated with the second change data into a sub plane while the first change data is being written into the master plane corresponding to the first category;
transferring the second change data written into the sub plane to the master plane associated with the second category upon completing the writing of the first change data into the master plane corresponding to the first category,
transferring the second change data from the volatile memory into the master plane corresponding to the second category if the master plane corresponding to the first category is in a usable state at the end of the predetermined time period,
wherein the apparatus data includes a plurality of portions of data, wherein each portion of data corresponds to a category from among the plurality of categories, and
wherein each portion of data is stored into a respective plane from among the plurality of master planes.

11. The nonvolatile memory writing method according to claim 10, further comprising:
transferring the first change data written in the sub plane to the volatile memory when the sub plane in which the first change data under the first category is stored exists at a time of power on of the apparatus; and
transferring the first change data from the master plane to the volatile memory when the sub plane in which the first change data under the first category is stored does not exist at a time of power on of the image forming apparatus.

12. The nonvolatile memory writing method according to claim 10, wherein:
the apparatus stores an order in which a sub plane writing unit writes change data into the plurality of the sub planes; and
the nonvolatile memory writing method further comprises:
writing the second change data into a sub plane from among the plurality of the sub planes other than an untransferred sub plane when writing the second change data into the nonvolatile memory while the untransferred sub plane exists, the untransferred sub plane being one of the plurality of the-sub planes from which the first change data is not yet transferred to the master plane corresponding to the first category; and
transferring the first change data written in a target sub plane to the master plane corresponding to the first category when the untransferred sub plane which precedes in the order the target sub plane does not exist.

13. The nonvolatile memory writing method according to claim 12, further comprising transferring the first change data written in the untransferred sub plane which is last in the order to the volatile memory when the untransferred sub plane exists at a time of power on of the apparatus.

14. The nonvolatile memory writing method according to claim 12, further comprising waiting until any one of the plurality of the sub planes becomes usable if the usable sub plane does not exist when writing the second change data into the nonvolatile memory while the untransferred sub plane exists.

15. The nonvolatile memory writing method according to claim 10, wherein the volatile memory and the nonvolatile memory store the apparatus data under corresponding categories of the apparatus data.

16. The nonvolatile memory writing method according to claim 15, wherein the nonvolatile memory comprises management information used for managing the categories of the apparatus data stored in the master plane and the sub plane.

17. The nonvolatile memory writing method according to claim 10, wherein the writing into the nonvolatile memory is performed based on most recent change data written in the volatile memory if the apparatus data has been changed a plurality of times within the predetermined time period.

18. The nonvolatile memory writing method according to claim 10, wherein the volatile memory has one of a usable state and a using state recorded in each of the master plane and the sub plane.

19. A method of writing apparatus data into a nonvolatile memory, comprising:
writing first change data into the volatile memory each time the apparatus data under a first category has been changed;
retaining, in the volatile memory at every time period, the first change data that is most recently written into the volatile memory within a predetermined time period:
retaining the first change data in the volatile memory after the predetermined time period; and
upon conclusion of each of a plurality of recurring time periods,
(a) determining whether apparatus data has been changed by determining whether a volatile memory retains the first change data corresponding to apparatus data that has been most recently changed within the predetermined time period;
(b) upon determining that the apparatus data has been changed within the predetermined time period, writing, into the nonvolatile memory, the first change data retained in the volatile memory within the predetermined time period; and
(c) avoiding writing the apparatus data within the predetermined time period into the nonvolatile memory if the apparatus data has not been changed within the predetermined time period,
wherein writing the first change data into the nonvolatile memory comprises:
starting writing, at the end of the predetermined time period, the first change data retained in the volatile memory;
writing the first change data from the volatile memory simultaneously with and independent of writing and retaining into the volatile memory;
writing the first change data and a first category associated with the first change data into a first sub plane from among a plurality of sub planes that serves as a temporary area of the nonvolatile memory;
transferring the written first change data from the first sub plane to a master plane from among a plurality of master planes that serves as a primary area corresponding to the first category if the master plane corresponding to the first category is in a using state at an end of the predetermined time period;
writing second change data and a second category associated with the second change data into the volatile memory while the first change data is being written into the master plane corresponding to the first category; and
transferring the second change data in the volatile memory to the master plane corresponding to the second category if the master plane corresponding to the second category is in a usable state at an end of the predetermined time period,
wherein each sub plane from among the plurality of sub planes is configured to store change data associated with any category from among the plurality of categories,
wherein each master plane is associated with a respective category from among a plurality of categories,
wherein the apparatus data includes a plurality of portions of data, wherein each portion of data corresponds to a category from among the plurality of categories, and
wherein each portion of data is stored into a respective plane from among the plurality of master planes.

20. The method of claim 19, wherein transferring the written first change data from the sub plane comprises transferring first change data from a most recently written one of the plurality of sub planes.

21. The image forming apparatus according to claim 1,
wherein, if an untransferred sub plane exists at an end of the predetermined time period, regardless of whether the master plane writing unit is not writing the first change data into the master plane corresponding to the first category at the end of the predetermined time period:
the temporary area writing unit is further configured to write the second change data into a second sub plane from among the plurality of sub planes, wherein the second sub plane is not an untransferred sub plane, and wherein the untransferred sub plane is one of the plurality of sub planes from which the change data has not yet been transferred to a master plane; and
the primary area transfer unit is further configured to transfer the second change data written into the second sub plane by the sub plane writing unit to the master plane corresponding to the second category when the master plane writing unit completes writing the first change data into the master plane corresponding to the first category.

* * * * *